United States Patent
Muppidi et al.

(10) Patent No.: US 8,687,959 B2
(45) Date of Patent: Apr. 1, 2014

(54) SYSTEM AND METHOD FOR CONFIGURATION DISCOVERY IN AN OPTICAL NETWORK

(75) Inventors: Srinivasa Sesha Soma Sekhar Muppidi, San Jose, CA (US); Gopinath Ramanan, Campbell, CA (US)

(73) Assignee: Ciena Corporation, Hanover, MD (US)

( * ) Notice: Subject to any disclaimer, the term of this patent is extended or adjusted under 35 U.S.C. 154(b) by 724 days.

(21) Appl. No.: 12/453,871

(22) Filed: May 26, 2009

(65) Prior Publication Data

US 2009/0304381 A1 Dec. 10, 2009

Related U.S. Application Data (63) Continuation of application No. 10/071,951, filed on Feb. 6, 2002, now abandoned.

(51) Int. Cl.
*H04B 10/00* (2013.01)

(52) U.S. Cl.
USPC .......................................................... 398/30

(58) Field of Classification Search
CPC .................................................. H04J 14/0227
USPC .............................................. 398/17, 25, 30
See application file for complete search history.

(56) References Cited

U.S. PATENT DOCUMENTS

| | | | | |
|---|---|---|---|---|
| 6,084,694 A * | 7/2000 | Milton et al. | ................... | 398/83 |
| 6,504,630 B1 * | 1/2003 | Czarnocha et al. | ............ | 398/15 |
| 6,718,141 B1 * | 4/2004 | deVette | .......................... | 398/82 |
| 6,968,131 B2 * | 11/2005 | Obeda et al. | ................... | 398/34 |
| 7,013,084 B2 * | 3/2006 | Battou et al. | ................... | 398/45 |
| 7,039,009 B2 * | 5/2006 | Chaudhuri et al. | ........... | 370/225 |
| 7,110,670 B1 * | 9/2006 | Au et al. | ......................... | 398/48 |
| 7,190,896 B1 * | 3/2007 | Wang et al. | ..................... | 398/30 |
| 2003/0031177 A1 * | 2/2003 | Robidas et al. | ............... | 370/392 |
| 2003/0145069 A1 * | 7/2003 | Lau et al. | ...................... | 709/220 |

OTHER PUBLICATIONS

J. Moy, RFC 2328, "OSPF Version 2", IETF, Apr. 1998.*
Lang et al, "Link Management Protocol (LMP)", draft-ietf-mpls-lmp-0.2.txt, IETF, Jun. 2001.*

* cited by examiner

*Primary Examiner* — Shi K Li
(74) *Attorney, Agent, or Firm* — Clements Bernard PLLC; Christopher L. Bernard; Lawrence A. Baratta, Jr.

(57) ABSTRACT

A system and method for discovering configuration errors in an optical network is disclosed. The neighbors of each node are discovered. An information model of the optical network is formed, which may be used to determine configuration errors. In one embodiment, each node exchanges node identification messages with neighboring nodes to discover its neighbors, publishes the node neighbor information to the optical network, and forms its own information model from the node neighbor information published by the nodes.

18 Claims, 4 Drawing Sheets

SYSTEM AND METHOD FOR CONFIGURATION DISCOVERY IN AN OPTICAL NETWORK

"This application is a continuation of U.S. patent application Ser. No. 10/071,951 filed Feb. 6, 2002. Applicant claims the benefit of the filing date this earlier filed application."

BACKGROUND OF THE INVENTION

1. Field of the Invention

The present invention relates generally to discovering information indicative of the configuration of an optical network. More particularly, the present invention is directed to discovering configuration errors in optical networks.

2. Description of Background Art

An optical network is typically configured for a particular application by provisioning the optical nodes to provide desired services between selected optical nodes. For example, in a wavelength division multiplexed (WDM) optical network, such as a dense wavelength divisions multiplexed (DWDM) network, the nodes may be provisioned to add, drop, or pass-through desired wavelength channels. Proper configuration of an optical network can also include selecting compatible node types. For example, typically all of the nodes must be of a compatible protection type. Additionally, in some optical networks each node must have compatible node settings. Moreover, in some optical networks there are parameters, such as span loss, that must be within a design range in order for the network to function properly.

Configuration errors may occur during the set-up, repair, upgrading, or operation of an optical network. In some cases, the network may deviate from the planned configuration because of human error during initial set-up, repair, or upgrading. For example, a technician may accidentally hook up the wrong optical fibers to the node ports, select the wrong node type, or select an incorrect node setting or node component for a node. Additionally, the network may deviate from the planned configuration if one or more network parameters or node parameters degrades over time. For example, effective span losses may increase over time, resulting in the actual network span loss being different than the planned network span loss.

The frequency at which configuration errors occur tends to increase with the number of network nodes and the complexity of the node design. Thus, while the discovery of configuration errors is important for all optical networks it is becoming an increasingly important issue in complex optical networks, particularly those in which each node must be selected to be compatible with the other nodes of the network.

What is desired is a system and method for discovering configuration information associated with an optical network.

SUMMARY OF THE INVENTION

A system and method is disclosed for discovering configuration information in an optical network. To begin with, the neighbors of each node are discovered. Using these relationships, a network configuration is determined having a topological map corresponding to the discovered relationships. In one embodiment, an alarm signal indicative of a configuration error is generated responsive to detecting a configuration error. The alarm signal may be used to generate an audio-visual warning on the user interface of an element management system or a craft terminal interface.

In one embodiment, each node determines its neighbors by receiving node identification messages from its neighbors. Each node identification message includes a node identifier and preferably other node configuration data, such as a node type, a node setting, or a node parameter. In this embodiment, each node then makes its neighbor information available to the network.

The discovered information may be analyzed in any portion of the network receiving the neighbor information in order to determine a network configuration in accord with the neighbor relationships. In one embodiment, each node receives neighbor information from the other nodes, forms an information model of the network, determines the network configuration, compares the discovered configuration to the provisioned configuration, and issues an alarm signal responsive to detecting a configuration error.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally comprises a system and method for discovering configuration information associated with an optical network. The discovered configuration information may be used to identify configuration errors in the optical network.

Figure 1A:
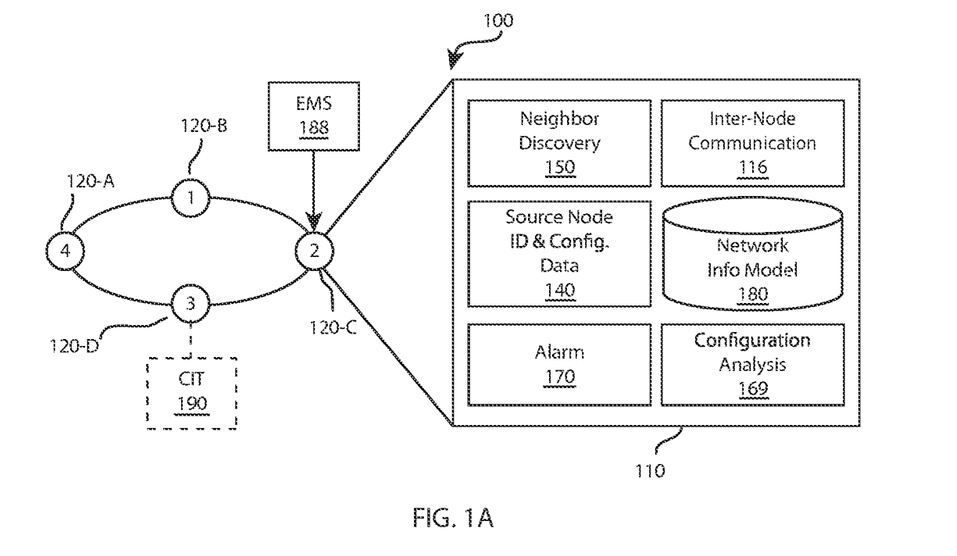
FIG. 1A is a block diagram of an optical network.

FIG. 1A is a high-level block diagram of an optical network 100 that includes a plurality of optical nodes 120. In one embodiment the optical network is a wavelength division multiplexed (WDM) optical network, such as a dense wavelength division multiplexed (DWDM) network. However, more generally, optical network 100 does not have to be a WDM network but may comprise a variety of optical network types, such as a time division multiplexed (TDM) network. Each individual optical node 120 is coupled to adjacent (neighboring) nodes by an optical span 130 comprising at least one optical fiber. Each node has node interfaces with one or more ports (not shown in FIG. 1A) for each span to be coupled to the node. While FIG. 1A shows a ring network, it will be understood that the present invention may be applied to a variety of network topologies, such as linear or mesh topologies.

An element management system (EMS) 188 is communicatively coupled to the nodes with any suitable data link, such as an Ethernet data link. The function of the EMS is to provide high-level administration of the optical network. EMS 188 may, for example, be used to provide provisioning data to each node. The provisioning data supplied to each node includes information for implementing a planned network configuration. For example, in a DWDM network the provisioning data may include a planned channel map (e.g., a ringmap for a ring network) or other information required to provision optical services between selected nodes. EMS 188 may also include a user interface for a user to monitor the status of the optical network.

An individual node 120 may also have a craft interface terminal (CIT) 190 coupled to the node. A CIT may be any local computer having a user interface for a technician to monitor the status of the optical node and/or the optical network. A CIT is commonly configured to emulate the user interface of EMS 188. In particular, a technician may use a CIT to monitor node status or alarm signals in a manner similar to EMS 188.

In one embodiment, each node 120 has neighbor discovery and configuration modules 110 to permit configuration information to be discovered. The modules may be implemented as software modules extending on a processor or be implemented all or in part as hardware, firmware, or dedicated circuits. Each node 120 includes an inter-node communication module 116 to communicate data between the nodes on an optical data link. Any suitable inter-node communications technique may be used. As one example, a dedicated optical supervisory channel may be used for neighboring nodes to communicate with each other using a message protocol (e.g., STS-3C). Alternatively, the information may be communicated in-band, interspersed with payload data. In a WDM embodiment, the OSC channel may be an out-of-band wavelength channel that is demultiplexed from wavelength channels entering the node and which is multiplexed with signal channels leaving the node.

Additionally, a message forwarding protocol may be used to forward messages (or a message payload) to subsequent nodes along the optical network, thereby permitting data to be published to the network (i.e., to make the data available to network elements that subscribe to receive the data). The message forwarding protocol may be any suitable message forwarding protocol. However, it is desirable to use one or more rules to reduce unnecessary message traffic forwarded along the network. Consequently, in one embodiment each node includes one or more rules for determining whether a message is relevant to other entities of the network and only forwards relevant messages. For example, in one embodiment, messages describing span loss or fiber type setting are terminated at a node because this information may be more efficiently processed at the node and included, if necessary, in other messages published by the node.

Each node also includes a source node identifier and configuration data 140. As an illustrative example, node 120-A may have a node ID of "4", node 120-B a node ID of "1", node 120-C a node identifier of "2", and node 120-D a node ID of "3." The node configuration data may be any attribute associated with a node required for the optical network to be in compliance with its provisioned configuration.

It will be understood that the node configuration data may include a variety of different types of information. For example, the node configuration data may include the node protection scheme (also known as node protection type), such as bi-directional line switched ring (BLSR), optical shared protection ring (OSPR), or uni-directional path switched ring (UPSR); the optical fiber type (e.g., fiber launch powers) for each span; node settings, such as switch trigger criteria or power management algorithm settings; band plan configurations, such as the use of symmetric bands in UPSR or conjugate bands in UPSR; node parameters measured by the node, such as span loss; or other attributes associated with a node being in compliance with a planned network configuration.

Figure 1B:
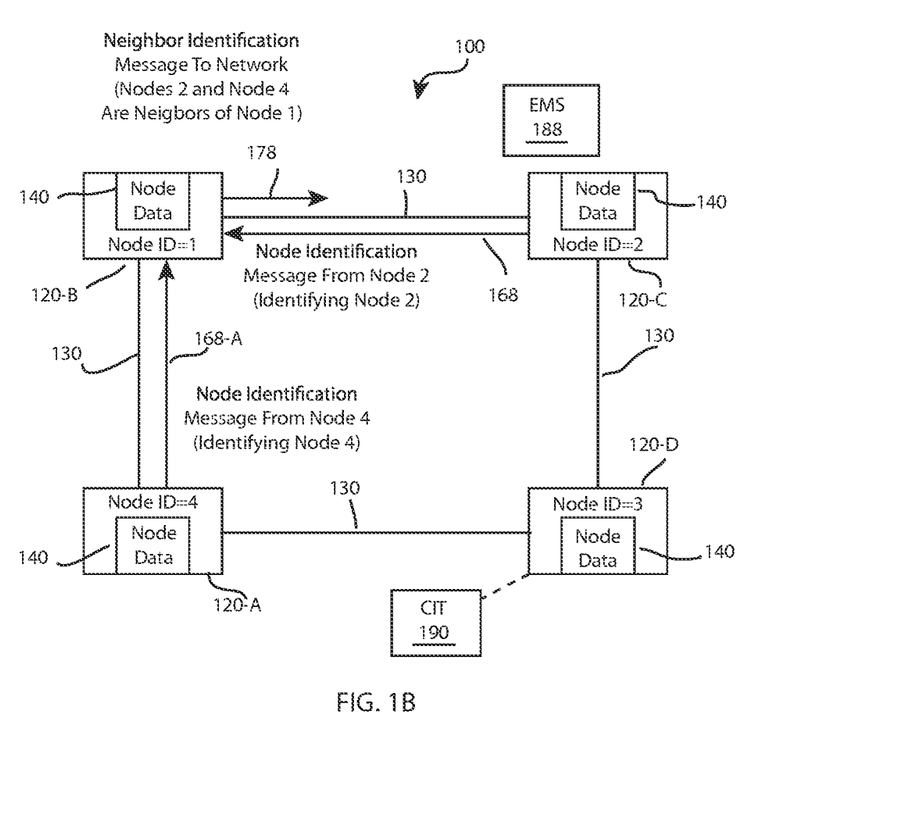
FIG. 1B illustrates some of the message traffic in the optical network of FIG. 1A.

Each node includes a neighbor discovery module 150. Referring to FIG. 1B, in accord with one embodiment of the present invention, the nodes transmit node identification messages 168 to adjacent neighboring nodes which identify the sending node. In one embodiment, the node identification messages 168 also include other node configuration data. The node identification messages received by a node are used by the node to create neighbor information describing the identity of its neighboring nodes. In the example of FIG. 1B, node 1 has as its neighbors node 2 and node 4. This information corresponds to nodes 1 and 2 being a first pair of neighbor nodes and 1 and 4 being a second pair of neighbor nodes. Since the neighbor information defines two nodes at either end of a span it also corresponds to span information describing a potential node-to-node link in the optical network.

The neighbor relationships are then published to the network in a node identification message 178. The discovered neighbor relationships are then available to other network elements. In one embodiment each node is adapted to exchange node identification messages 168 with all of its neighbors and to publish neighbor identification messages 178 to the network.

In the embodiment of FIG. 1B, at least one node receives the published neighbor information and forms an information model of the optical network. In one embodiment, each node forms its own network information model 180 that includes the neighbor relationships that can be obtained from neighbor identification messages 178. For example, in a ring network the network information model may correspond to a ring map. The information model may also include other configuration data published by the nodes, such as node type, node settings, or parameters measured by the nodes. A configuration analysis module 160 analyzes neighbor relationships. Since a pair of neighbors corresponds to a possible node-to-node link, the neighbor relationships may be analyzed using a mapping algorithm to determine a network configuration having a topological map consistent with the neighbor relationships.

The network configuration determined from the information model may be used in a variety of different ways. In one embodiment, the discovered network configuration is provided to an EMS. This permits an EMS to correct its map of the network. An EMS may, for example, display the discovered network configuration on a user interface. Additionally, an EMS may use the discovered network information to correct its model of the network configuration and to issue appropriate error correction commands. For example, the EMS may use the discovered network configuration to determine if the network configuration can provide a desired quality of service (QOS) and level of protection. If the discovered network configuration is incapable of providing the desired QOS and protection, the EMS may use the discovered network configuration to determine a correction to the network sufficient to provide the desired QOS and level of protection. For example, in one embodiment of an error correction mode, the EMS determines if one or more nodes may be re-provisioned to provide the desired service and issues appropriate provisioning commands. Alternatively, the EMS may determine a suitable hardware or software adjustment to one or more nodes for the network to provide the desired QOS and level of protection.

In one embodiment, an alarm generator 170 compares the discovered configuration with the provisioned configuration and issues an appropriate alarm signal if it detects a configuration error. The alarm generator 170 may, for example, receive the provisioning data from the EMS 188 along with rules for determining the occurrence of a configuration error.

In one embodiment, neighbor discovery 150 and configuration analysis 160 is performed on a periodic basis after the network is set up. However, it will also be understood that the neighbor discovery and configuration analysis may be configured to be triggered manually or to be automatically triggered by pre-selected node or network events. For example, in one embodiment, discovered information is validated each time that one or more nodes are provisioned. Subsequent to a provisioning event, the discovered information model may be held as valid for a preselected period of time. In one embodiment, the discovered information is considered valid for a configurable period of time. For example, the period of time may be selected by the EMS (e.g., once every five minutes). After the selected period of time elapses, a new round of neighbor discovery is initiated.

Figure 2:
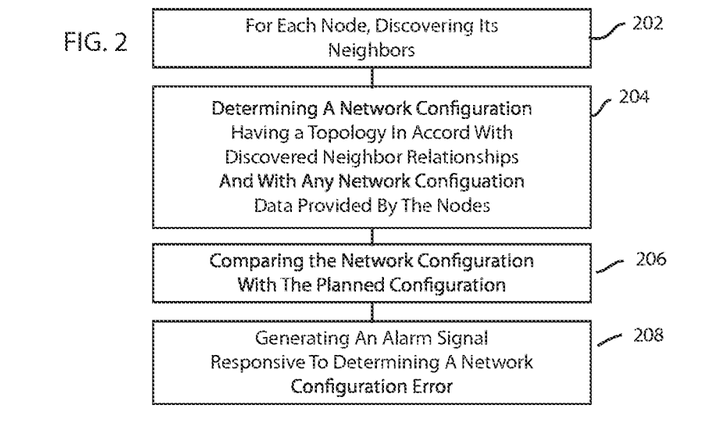
FIG. 2 is a flow chart of one method of discovering network configuration.

FIG. 2 is a flow chart of one method of forming configuration information for an optical network. The neighbors of each node are discovered 202 by exchanging node identification messages 168 between the nodes, with each identification message including a source node ID. It is desirable that the exchange of node identification message produces sufficient information to identify fiber misconnection errors. Consequently, in one embodiment, the source node ID has an associated exit span identifier to identify the exit port from which the message originated. At the receiving node an entrance span identifier may be associated with the received identification message to identify the entrance port from which the message was received. This data may be used to identify node-to-node links for neighboring nodes. In one embodiment, each node publishes data describing its neighbors to at least one other portion of the optical network. This may, for example, include data pairs describing the ID of the receiving node and the ID of each sending node (e.g., data identifying pairs of neighboring nodes). The data may be forwarded from node-to-node across an internode communications channel.

A network configuration is determined 204 consistent with the neighbor information and any node configuration data supplied by the nodes. For example, a mapping technique may be used to select a topological arrangement of nodes consistent with the pairs of neighboring nodes described by the neighbor information. In one embodiment, an information model is formed that identifies pairs of neighboring nodes to determine the network spans. The information model may also include other configuration data for each node such as node type, span loss, switch triggers, provisioned span loss, or power management data. The network configuration may be determined at any portion of the network that has formed or received the information model. In one embodiment, each node receives node pair data from other nodes and forms its own information model so that it can perform its own analysis of the node configuration.

The discovered network configuration may be compared with the planned configuration 206. In one embodiment, an alarm signal is generated responsive to determining a network configuration error 208. The alarm signal may be used to generate an error message displayed on an EMS or a CIT.

Figure 3:
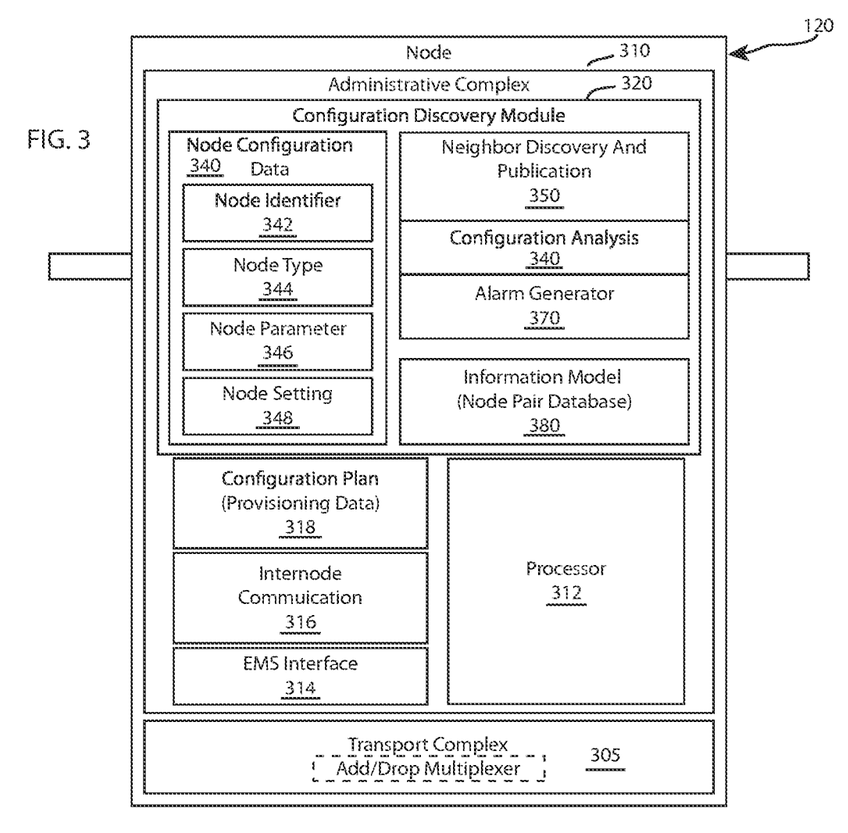
FIG. 3 is a block diagram showing one embodiment of a network node.

FIG. 3 is a block diagram showing in more detail the major components of one embodiment of an optical node 120 for practicing the present invention in a WDM network. In this embodiment, optical node 120 typically includes a transport complex 305 and an administrative complex 310. The transport complex 305 includes the optical components for adding, dropping, and passing through optical wavelength channels. The administrative complex 310 provides high-level administrative functions for the node. It includes at least one processor 312 having an associated memory. The administrative complex 310 has an EMS interface 314 for communicating with an EMS or CIT. An inter-node communication module 316 may be implemented using any suitable technique, such as communicating data between nodes on an optical supervisory channel (OSC). The administrative complex 310 receives provisioning data 318 from the EMS 188. The provisioning data 318 includes the planned optical network configuration (e.g., information corresponding to a map of the planned network topology and other configuration information)).

The administrative complex 310 includes a configuration discovery module 320. In one, configuration discovery module 320 is a software module residing on a memory coupled to processor 312. Configuration discovery module 320 includes a neighbor discovery and publication module 350. The neighbor discovery and publication module 350 identifies adjacent (neighboring) pairs of nodes and publishes data about the node pairs to the optical network. A configuration analysis module 360 forms an information model 380 of the network from the node pair information published by the optical nodes. In one embodiment, an alarm generator module 370 generates an alarm signal if there is a discrepancy between the discovered configuration and the configuration plan 318. The alarm signal may, for example, be used to generate a message on the user interface of a CIT or EMS indicating the nature of the configuration error and its likely location.

Each node includes node configuration data 340. For example, the node configuration data 340 may be stored in a suitable data structure residing within a portion of memory, such as a data table having a plurality of data fields. The node configuration data 340 has an associated unique node identifier 342 that identifies the node. The node identifier may, for example, be a numerical or alpha-numeric identification (ID). Additionally, each node may also include other data useful to determine network configuration errors. In one embodiment, node configuration data 340 includes the node type 344. As one example, the node type may refer to the protection type for the node. More generally, node configuration data 340 may include any node setting 348. Node setting 348 may, for example, be a setting for a power management algorithm in the node or for a switch trigger. Additionally, node configuration data 340 may include a node parameter 346 for any data measured by the node associated with the network configuration, such as a parameter indicative of a span loss detected by the node. In one embodiment, the configuration data includes the fiber type. Other examples of configuration data include switch triggers.

As indicated by arrow 168-A in FIG. 1B, one node 120-A may transmit its node configuration data 340 to another neighboring node 120-B along the optical span 130 coupling the nodes. As described below in more detail, it is desirable to determine the span interfaces at which the span is connected to the nodes. In one embodiment, data identifying the exiting span interface (e.g., the exit port) is associated with the node configuration data 340. At the receiving node 120-B, the received node configuration data may be used to form node pair data. An identifier for identifying the receiving span interface (e.g., the receiving port) is preferably also associated with the received node configuration data.

Figure 4A:
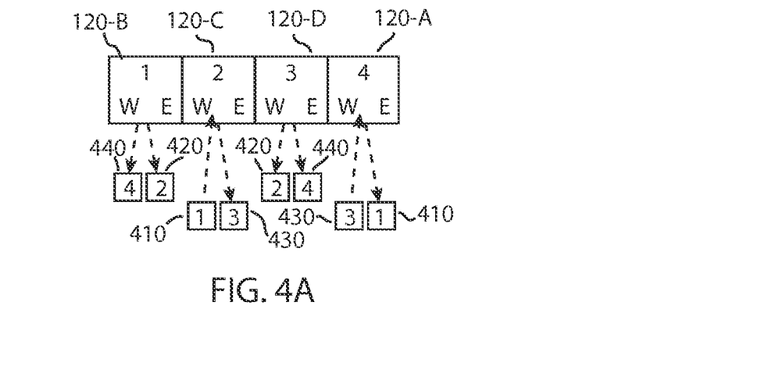
FIG. 4A is a diagram illustrating how neighbor node information may be correlated to determine the network topology.

FIG. 4A is a diagram illustrating relationships of node configuration data received at each node 120-A, 120-B, 120-C, and 120-D for the network of FIG. 1. In this example, node 120-A has a node ID of "4", node 120-B has a node ID of "1", node 120-C has a node ID of "2" and node 120-D has a node ID of "3". Each node 120 will receive node configuration data from its adjacent neighboring nodes that includes the node ID of the adjacent node. In this example, each node has two spans, an East (E) span and a West (W) span. Thus in the example of FIG. 4A, node 1 will receive node configuration data 420 from node 2 (via its East span) and node configuration data 440 from node 4 (via its West span). Node 2 receives node configuration data 410 from node 1 (via its West span) and node configuration data 430 from node 3 (via its East span). Node 3 receives node configuration data 420 from node 2 (via its West span) and node configuration data 440 from node 4 (via its East span). Node 4 receives node configuration data 430 from node 3 (via its West span) and node configuration data 410 from node 1 (via its East span).

Referring to Table I, an information model 380 may be formed to describe the relationship of the neighboring pairs of nodes. The information model preferably has a data format that facilitates determining a topological map having the same neighbor relationships. As one example, for a ring network the information may have a data structure from which a ring map may be calculated. For the example of FIG. 4A, the East span of node 1 is coupled to the West span of node 2; the East span of Node 2 is coupled to the West span of Node 3; the East span of Node 3 is coupled to the West span of Node 4; and the East span of Node 4 is coupled to the West span of Node 1. Additionally, the information model may also summarize the node configuration data of each node, such as the node type.

TABLE I

Table illustrating an exemplary information model.

| Node Pairs | Node Type |
|---|---|
| 1E-2W | Node 1 = TI |
| 2E-3W | Node 2 = T2 |
| 3E-4W | Node 3 = TI |
| 4E-1W | Node 4 = TI |

Figure 4B:
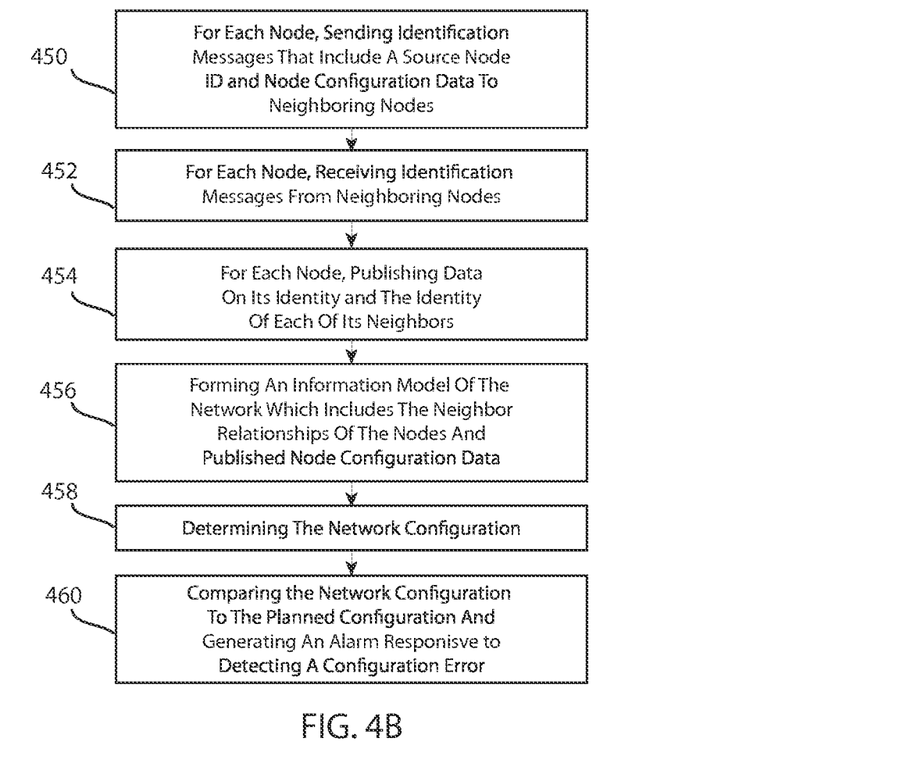
FIG. 4B is a flow chart illustrating a method of determining network configuration from the node information of FIG. 4A.

FIG. 4B illustrates another method of determining network configuration. Each node sends identification messages 450 to its neighbors that include a source node ID and node configuration data. Consequently, each node receives identification messages from neighboring nodes 452. Each node publishes 454 data on its identity and the identity of each of its neighbors in a neighbor identification message. Each node may also publish its own node configuration data with the neighbor identification information or in a separate publication. An information model is formed 456 that includes the neighbor relationships and published node configuration data. The information model may be formed in any portion of the network receiving the published neighbor information. However, as described below in more detail, in one embodiment each node forms its own information model. The information model is sufficient, in combination with knowledge of the basic network topology class (e.g., linear or ring) to determine network links having the neighbor relationships of the pairs of neighbors. From this the network configuration 458 may be determined. The network configuration may be compared to the planned configuration 460 and an alarm generated responsive to detecting a configuration error.

In an optical network it is desirable that a discovery configuration module 320 require a comparatively small amount of inter-node communication bandwidth and be compatible with other inter-node signaling functions. In particular, the node identification 160 and neighbor identification 170 messages may be in the form of message packets. In one embodiment, each configuration discovery module exchanges node and neighbor identification message packets with neighboring nodes on a periodic basis (e.g., every five minutes) since this arrangement reduces the bandwidth requirements while also permitting the information model to be refreshed on a frequent enough basis to assist users to identify compatibility errors during set-up, maintenance, and upgrading.

The configuration and discovery module 320 may be programmed to have a discovery phase and validation phase in accord with the periodic exchange of message packets. In one embodiment, inter-node messages are communicated in a message packet format having a payload with fields to convey the node ID and configuration data. The message packets may be communicated between neighboring nodes using any suitable data format. For example, a configuration message packet may have a payload with fields selected to interface with the signaling interface to set, read, send, and receive node configuration data through a signaling interface. In one embodiment, the message packets include a time-to-live (TTL) field so that the message packets decay (leave) the system if they are not properly processed after a preselected time period. For example, the TTL may be decremented each time they are forwarded along the optical network.

Figure 5:
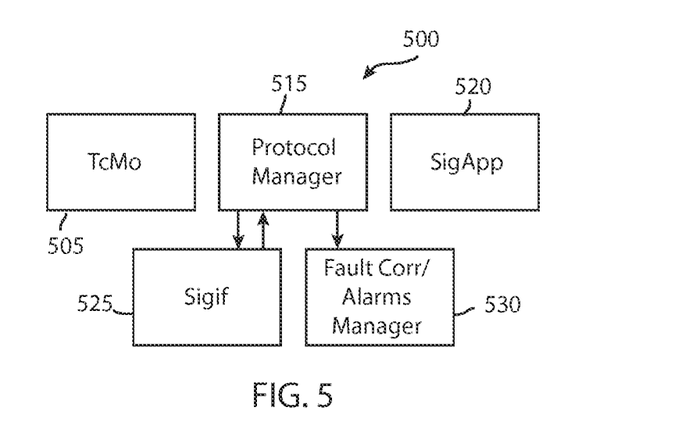
FIG. 5 is a block diagram of major software modules for a low processing overhead implementation of a configuration discovery module

In one embodiment, configuration discovery module 320 is implemented as managed objects of the administrative complex software using a suitable software language, such as the $C^{++}$ language. The $C^{++}$ language includes classes, where a class in $C^{++}$ is defined as a collection of data and the procedures that operate on the data. FIG. 5 is a block diagram of one embodiment of a configuration discovery module implemented as a plurality of software modules residing on a processor 312 implemented using computer classes and threads compatible with an operating system running on a microprocessor. A Provisioning Information object, TcMo, 505 is used to receive the provisioning information of the administrative complex and provide it to the Protocol Manager 515. Protocol manager 515 includes a finite state machine to coordinate the actions of the other modules. A Signal Application 520 discovers the immediately connected neighbors and supplies this information to the Protocol Manager 515. In one embodiment, Signal Application 520 (SigApp) is a signal infrastructure module that extracts the node configuration data in received message packets. It is used to send message packets with configuration information to other network elements. As one example, the Signal Infrastructure Module 520 may use an OSC communication module to communicate with other nodes. Fault Correlation and Alarms Manager 525 is an object that supports generating an alarm signal to alert a user to configuration errors. It publishes an alarm event that may be processed to display an error message to a user (e.g., via an EMS or CIT).

Figure 6:
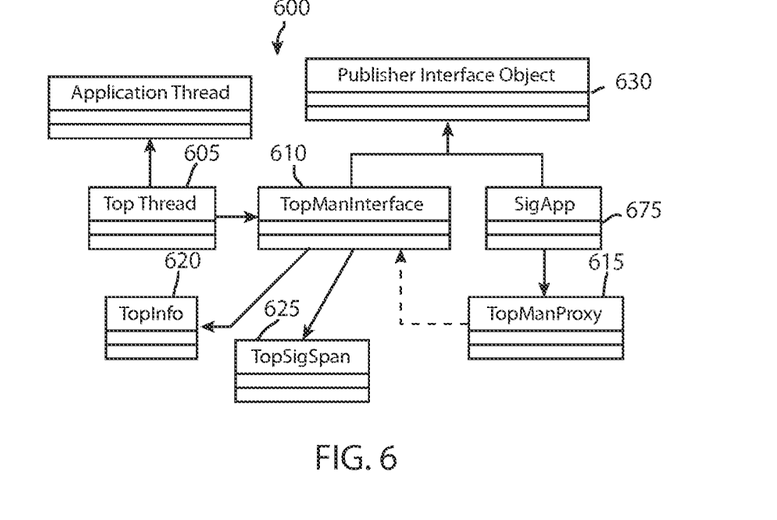
FIG. 6 is a block diagram showing in more detail some of the software components for the implementation of FIG. 5.

FIG. 6 is a Rose model diagram 600 illustrating in more detail some of the software relationships that can be used to implement the functions described for the configuration discovery application 500 of FIG. 5. The TopThread 605 is a class that represents the thread that the Protocol Manager runs in. In one embodiment it inherits from an application thread class a generic thread model. The TopManInterface class 610 implements a state machine and configuration discovery algorithm. This class receives and stores the provisioned information. It also handles messages sent by other network elements and constructs an information model of the network. In one embodiment the class continues a discovery phase until a stopping condition is satisfied, after which it compares the discovered configuration to the provisioned configuration and determines whether a configuration error exists. If a configuration error exists, it generates an alarm signal. A PublisherInterfaceObject 630 is used to publish configuration information. A TopManProxy 615 is a proxy interface to permit entities in the administrative complex and the transport complex to communicate with the Protocol Manager. TopInfo 620 is a class that represents a model of the span that is used to send messages from the node and includes methods to send and receive a configuration message packet on the optical network. TopSigSpan 625 is a class that represent mode of the span that is used to send messages from the node. The configuration protocols call methods that are implemented in this class to send and receive protocol packets on the optical network. SigApp 675 implements the methods that are required for the discovery of nodes that are immediately connected to the spans of the node. SigApp 675 provides this information to the Protocol manager by making use of the proxy class.

The present invention provides many benefits. One benefit of the present invention is that an alarm signal can be generated indicative of an incorrect neighbor and/or incorrect optical fiber connection. When optical nodes are setup, serviced, or upgraded, there is a possibility that the fibers will be hooked up incorrectly. For example, in an optical node having two spans, the fiber connections may be reversed, resulting in the each span having different neighbors than intended. Thus, in one embodiment the discovered network configuration is compared to the provisioned network configuration. If all of the node neighbors of a node match the provisioned configuration, the fibers are correctly connected. A fiber misconnection alarm signal and/or a neighbor mismatch alarm is generated in the event that the fiber connections to the node are misconnected.

Another benefit of the present invention is that it may be used to generate an alarm signal indicating that a node is of an incompatible node type. For example, in an optical network each node must be of a compatible protection type. As optical networks become more complex, there is an increasing likelihood that an incompatible node type may be inadvertently used. Thus, in one embodiment, a node type incompatibility alarm signal is generated responsive to determining that a node has an incompatible node type.

Yet another benefit of the present invention is that it may be used to generate an alarm signal indicative of an incompatible node setting. As optical node design has become more sophisticated, some optical node designs permit one or more node settings to be selected to optimize the network performance. Some examples include switch settings and power management threshold settings. However, if the settings are not set appropriately, the node settings will be incompatible with each other. Consequently, in one embodiment, an incompatible node setting alarm signal is generated responsive to determining that a node has an incompatible node setting.

Still yet another benefit of the present invention is that it may be used to determine incompatible or incorrect node parameters associated with the performance of the optical network. As optical nodes become more sophisticated they increasingly include diagnostic capabilities to analyze attributes of the optical network. For example, optical span loss may be measured at an optical node using an optical detector within the transport complex. The span loss must be within a design range to ensure proper operation of the optical network. Similarly, other parameters measured at the node may be required to be within a design range. Consequently, in one embodiment, the node parameters are compared to the provisioned network configuration and an incompatible node setting alarm signal is generated responsive to determining a node parameter error.

The present invention may be used to detect band mismatches, i.e. to validate that all of the nodes of a DWDM network are using a compatible band plan. Typically all of the nodes must be either of a symmetric band or a conjugate band type. For example, an alarm signal may be generated responsive to detecting that symmetric and conjugate bands are both used in the network.

Additionally, the present invention may be used to detect mismatches in the fiber type. The optical fiber type determines the optical attenuation and maximum launch power characteristics of the fiber. Consequently, in one embodiment, the fiber type parameters are compared to the provisioned fiber types and an incompatible fiber type alarm signal is generated responsive to determining an incompatible fiber type.

It will also be understood that the alarm signals generated from each node may be correlated with each other to identify signaling problems within one node. In some cases, a node may lose its inter-node signaling capability. For this case, the node may no longer receive or send messages with the other nodes. The node with the signaling problem is not capable of refreshing its information model of the optical network. However, the other nodes of the optical network with functioning signaling capabilities can form their own information models of the optical network from which the node with signaling problems may be identified. Consequently, one benefit of correlating the information models processed by a plurality of nodes is that it facilitates locating configuration errors should one or more of the nodes have inter-node signaling problems.

While a preferred embodiment is for each optical node to form its own information model 180 and perform its own configuration analysis, it will be understood that this function may also be performed by an EMS or other element configured to receive the neighbor information from the network. Moreover, it will be understood that the invention may be practiced with only a subset of the nodes forming an information model and performing a configuration analysis. For example, a single optical node could be used to acquire the neighbor information messages, form an information model, analyze the configuration, and issue alarm signals.

It will also be understood that the node and neighbor identification information may be communicated using any suitable method. In one embodiment each node independently generates its own node identification and neighbor identification message. However, each node may also act responsive to messages from the other nodes. Additionally, while each node may merely forward neighbor identification message on through the network, it will be understood that each node may add its neighbor information to each forwarded message.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method to determine configuration information associated with an optical network having a plurality of wavelength division multiplexed optical nodes coupled by optical fiber spans, the method comprising:
   each node autonomously originating and publishing an identification message to each of its neighbors through an optical supervisory channel comprising an out-of-band wavelength channel, each said identification message including a source node identifier identifying the originating node for the message, the identity of the originating nodes' neighbors and including node configuration data associated with the node including information about the configuration of the originating node and neighboring nodes of the originating node, the node configuration data comprises optical span loss associated with the optical fiber spans coupled to the node measured by an optical detector, wherein the node configuration data further comprises switch triggers, power management data, node protection scheme, wavelength plan, and node type;
   at each node, publishing neighbor identification messages to each of the plurality of nodes comprising the identity of the node, the identity of its neighbors, and the node configuration data associated with the node; and
   determining a network configuration for the portion of the network received by the node consistent with the published neighbor identification messages received by the node, wherein the network configuration is determined in accord with neighbor relationships from the published neighbor identification messages, and wherein the network configuration is checked to ensure the node configuration data from each node is within a design range for the network.

2. The method of claim 1, further comprising:
   generating an alarm signal at an element management system indicative of a configuration error responsive to detecting an error in the network configuration.

3. The method of claim 2, wherein the node configuration data includes the node protection type and the alarm signal is an incompatible node protection type alarm signal generated responsive to determining that a node is of an incompatible node protection type.

4. The method of claim 2, wherein the node configuration data includes a node setting and the alarm signal is an incompatible node setting alarm signal generated by the node responsive to determining that a node has an incompatible node setting.

5. The method of claim 2, wherein the node configuration data includes a node parameter associated with the network configuration and the alarm signal is an incompatible node parameter alarm signal generated at the node responsive to determining that at least one node has an incompatible node parameter.

6. The method of claim 2, wherein the nodes publish information sufficient to determine the span interfaces by which they are coupled to neighboring nodes and the alarm signal is an incorrect fiber connection alarm signal generated responsive to determining that at least one node has incorrectly connected fibers.

7. The method of claim 1, further comprising:
   responsive to determining that the network configuration differs from a planned configuration, issuing an error correction command to alter at least one aspect of the optical network to form a compatible network configuration.

8. An optical node for an optical network, comprising:
   an optical transport complex for adding, dropping, and passing through wavelength division multiplexed (WDM) optical channels and measuring optical span loss;
   an administrative complex for administering the optical transport complex and having a memory adapted to receive provisioning data for the optical transport complex;
   an inter-node communication module coupled to the administrative complex for autonomously sending data messages with neighboring nodes on an inter-node data channel over an optical supervisory channel comprising an out-of-band wavelength from the WDM channels and publishing and storing data received in data messages to the optical network, the data messages comprise the measured optical span loss associated with optical fiber spans coupled to the node, wherein the data messages further comprise switch triggers, power management data, node protection scheme, wavelength plan, and node type; and
   a configuration discovery module for identifying adjacent pairs of nodes from node identification and configuration data from the neighboring nodes in received data messages; and
   a neighbor discovery and publication module to exchange node identification messages with neighboring nodes and publish neighbor information to all nodes in the optical network, wherein the neighbor information is based upon the node identification messages, wherein each of the nodes is configured to check to ensure the neighbor information from each node is within a design range for the network.

9. The optical node of claim 8, wherein the configuration discovery module further comprises:
   a configuration analysis module forming an information model of the optical network consistent with the node relationships of the neighbor information; and
   an alarm generator comparing the information model with the provisioning data and generating a configuration alarm responsive to detecting an error in the network configuration.

10. The optical node of claim 9, wherein the configuration discovery module includes node configuration data-comprising a node identifier and at least one network attribute associated with the node and issues an alarm signal responsive to detect a configuration error.

11. A wavelength division multiplex (WDM) optical network having a plurality of WDM optical nodes coupled by optical spans;
   each of said optical nodes is coupled to a neighboring optical node by at least one of said optical spans comprising optical wavelength channels and an optical supervisory channel on an out-of-band optical wavelength from the optical wavelength channels, and each of said optical nodes configured to measure span loss on the at least one of said optical spans;
   each of said nodes includes node interfaces with at least one port;
   an element management system (EMS) is communicatively coupled to said nodes using a data link;
   each of said nodes includes discovery and configuration modules to permit configuration information of a pair of neighboring nodes to be discovered over the optical supervisory channel, and each of said nodes and said pair of neighboring nodes includes a source node identifier and configuration data comprising the measured span loss, wherein the configuration data further comprises switch triggers, power management data, node protection scheme, wavelength plan, and node type;

upon receipt of configuration information discovered by said nodes, each of said nodes forms an information model of the discovered portions of the optical network received by the node; and upon forming the information model, each of said nodes is configured to publish neighbor identification messages to all other nodes of said nodes thereby enabling any of said nodes to determine a network configuration comprising checking to ensure the configuration data from each node is within a design range for the network.

12. The optical network as set forth in claim 11, wherein: said network includes a provisioned network configuration and an alarm signal is generated at the node when a mismatch occurs between said provisioned network configuration and the configuration information discovered by said nodes.

13. The optical network as set forth in claim 11, wherein: each of said nodes includes switch settings and power management threshold settings.

14. The optical network as set forth in claim 13, wherein: an incompatible node setting alarm is generated when either one of said switch settings or said power management threshold settings of one of said nodes does not match said settings of a neighboring node.

15. The optical network as set forth in claim 11, wherein: each of said nodes includes an optical detector within a transport complex for determining optical span loss.

16. The optical network as set forth in claim 15, wherein: a span loss alarm is generated when span losses exceed a design range.

17. The optical network as set forth in claim 11, wherein: each of said nodes of the optical network use a compatible band plan.

18. The optical network as set forth in claim 11, wherein: when one of said nodes loses its signaling capability, other network nodes can form information models of the network so that the node that has lost its signaling capability can be identified.

\* \* \* \* \*